United States Patent [19]

Miller

[11] Patent Number: 5,061,458
[45] Date of Patent: *Oct. 29, 1991

[54] DECONTAMINATION APPARATUS FOR ENVIRONMENTAL PROTECTION

[75] Inventor: Paul C. Miller, Elkton, Md.

[73] Assignee: Groundwater Technology, Inc., Norwood, Mass.

[*] Notice: The portion of the term of this patent subsequent of Jan. 9, 2007, has been disclaimed.

[21] Appl. No.: 416,970

[22] Filed: Oct. 4, 1989

Related U.S. Application Data

[63] Continuation-in-part of Ser. No. 78,779, Jul. 28, 1987, Pat. No. 4,892,664.

[51] Int. Cl.$^5$ ................................................ F01N 3/10
[52] U.S. Cl. ....................................... 422/173; 55/183;
55/196; 203/10; 210/170; 210/181; 210/188;
422/174; 422/177
[58] Field of Search ...................... 55/46, 51, 53, 183,
55/196, 208; 166/75.1, 267; 203/10; 210/750,
763, 765, 766, 747, 181, 188, 170; 422/173, 174,
177; 723/230, 239

[56] References Cited

U.S. PATENT DOCUMENTS

| | | | |
|---|---|---|---|
| 2,690,425 | 9/1954 | Moses et al. | 210/762 |
| 2,872,415 | 2/1959 | Schleyer | 210/750 |
| 2,940,835 | 6/1960 | Scofield | 422/177 |
| 2,944,396 | 7/1960 | Barton et al. | 210/763 |
| 3,013,628 | 12/1961 | Jacobs et al. | 422/173 |
| 3,029,202 | 4/1962 | Brown | 210/763 |
| 3,442,802 | 5/1969 | Hamilton | 210/763 |
| 3,475,282 | 10/1969 | Hamilton | 203/49 |

(List continued on next page.)

FOREIGN PATENT DOCUMENTS 2035814  6/1980  United Kingdom ................... 55/53

OTHER PUBLICATIONS

Health and Environmental Sciences Dept. ApI, "Examination of Venting for Removal of Gasoline Vapors from Contaminated Soil," Publication No. 4429, Mar. 1980, pp. 1–25.

Exothermics–Eclipse Literature.
Johnson Matthery Chemicals Ltd.
ARI Product Literature.
API Publication, "Cost Model for Selected Technologies for Removal of Gasoline Components from Groundwater".
ORS Product Literature (Date unknown).

*Primary Examiner*—Peter Hruskoci
*Attorney, Agent, or Firm*—Fish & Richardson

[57] ABSTRACT

A decontamination converter apparatus installed at an outdoor site where organic compounds have been stored and where such compounds have entered the ground as contaminants and endanger the groundwater comprising an inlet conduit constructed to receive an air stream, produced at the site, that carries organic contaminants; preheating means comprising (a) a heat exchanger and (b) an externally powered heater, said preheating means arranged to preheat said site-produced air stream carrying said contaminants; an oxidizing catalytic converter having a predetermined minimum operating temperature for efficient operation and arranged to receive the said air stream from said preheater means and constructed to oxidize said organic contaminants to produce a decontaminated effluent air stream substantially free of said organic contaminants; and ducting directing the thus decontaminated, hot effluent air stream from said catalytic converter through said heat exchanger and thence to the atmosphere; said heat exchanger being effective to cause the decontaminated air stream to transfer heat to the incoming site-produced air stream that carries said contaminants and said heater of said preheating means constructed and arranged to cooperate with said heat exchanger to elevate the temperature of said preheated air stream reaching said catalytic converter to at least said minimum operating temperature, to ensure catalytic conversion of said organic contaminants to decontaminated form before release to the atmosphere.

6 Claims, 3 Drawing Sheets

U.S. PATENT DOCUMENTS

| | | | |
|---|---|---|---|
| 3,690,840 | 9/1972 | Volker | 422/173 |
| 3,804,756 | 4/1974 | Callahan et al. | 210/763 |
| 3,867,287 | 2/1975 | Jakob | 210/750 |
| 3,898,058 | 8/1975 | McGill | 55/53 |
| 3,912,598 | 10/1975 | Dick | 202/185 |
| 3,931,390 | 1/1976 | Palilla et al. | 423/244 |
| 3,984,311 | 10/1976 | Diesen et al. | 210/763 |
| 3,997,303 | 12/1976 | Newton | 55/185 |
| 4,018,568 | 4/1977 | Brewer | 210/763 |
| 4,048,007 | 9/1977 | Valle-Reistra | 55/53 |
| 4,167,973 | 9/1979 | Forte et al. | 210/750 |
| 4,236,973 | 12/1980 | Robbins | 203/10 |
| 4,330,513 | 5/1982 | Hunter et al. | 422/177 |
| 4,526,692 | 7/1985 | Yohe | 210/747 |
| 4,593,760 | 6/1986 | Visser | 166/267 |
| 4,600,508 | 7/1986 | DeGhetto | 210/170 |
| 4,611,950 | 9/1986 | Russomano | 405/128 |
| 4,702,892 | 10/1987 | Betz | 422/177 |
| 4,730,672 | 3/1988 | Payne | 210/170 |
| 4,892,664 | 1/1990 | Miller | 210/747 |
| 4,906,338 | 3/1990 | DeLoach | 203/49 |

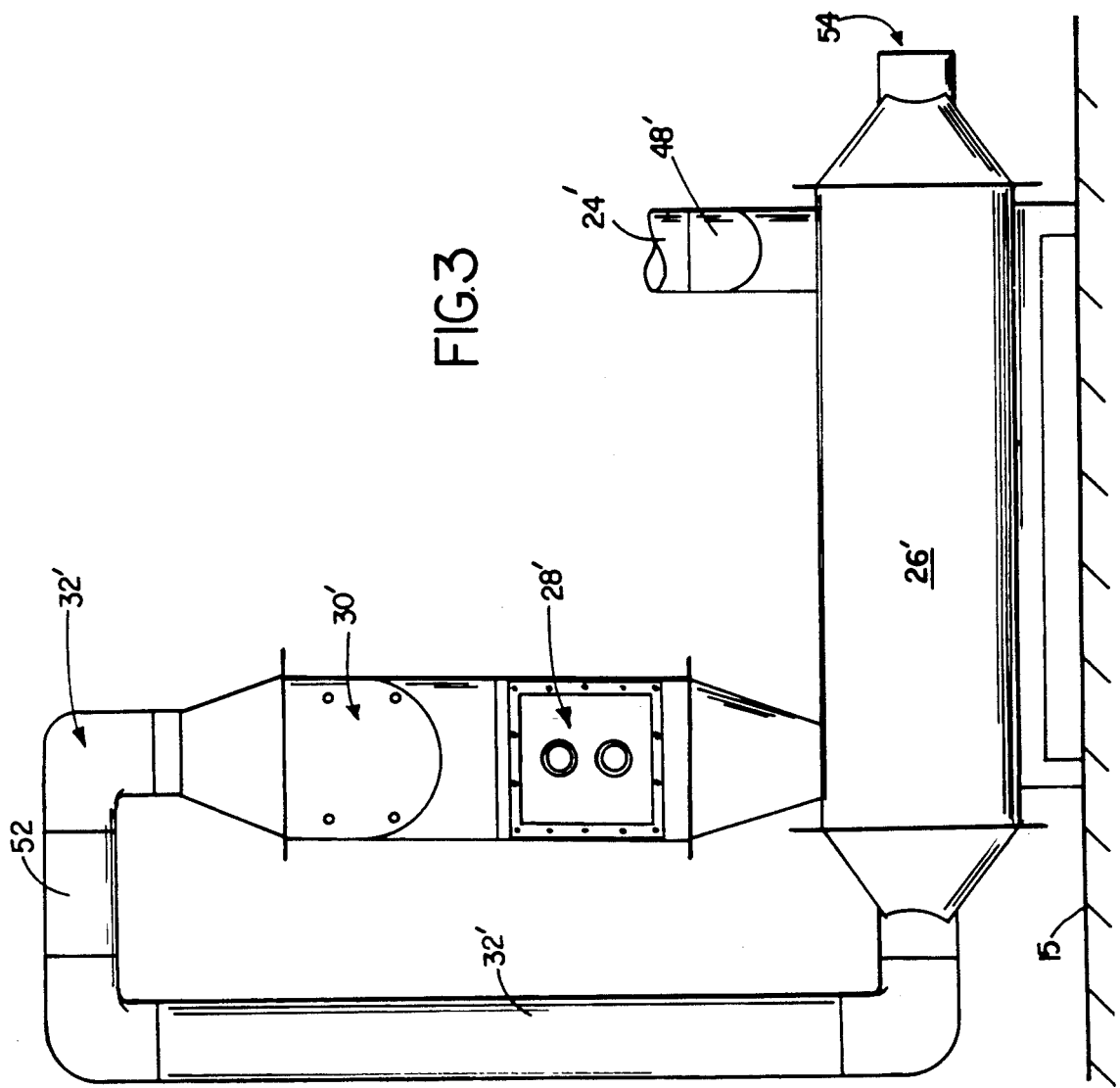

DECONTAMINATION APPARATUS FOR ENVIRONMENTAL PROTECTION

This application is a continuation-in-part of co-pending application U.S. Pat. No. 078,779, filed July 28, 1987, now U.S. Pat. No. 4,892,664 entitled "Decontamination of Sites Where Organic Compound Contaminants Endanger the Water Supply."

Environmental regulations strictly mandate maximum levels of volatile organic compounds (VOCs) that may be present in groundwater flowing beneath an industrial or storage facility.

Methods proposed for addressing this problem have included such techniques as air stripping, hydrocarbon contaminant adsorption and chemical treatment.

SUMMARY OF THE INVENTION

According to one aspect of the invention, a method for decontaminating water which is contaminated by small concentrations of dissolved volatile organic compounds comprises the process of introducing a flow of the water to an air stripping stage, including directing the water through a packed column and directing a flow of air through the column to air-strip the organic molecules from the contaminated water, releasing the thus decontaminated water substantially free of the compounds to the environment, pretreating the organic compounds-carrying air in the substantial absence of water particles by a preheater means. passing the heated air through a catalytic stage that oxidizes the organic compounds, and releasing the gaseous effluent from the catalytic stage to the atmosphere substantially free of the organic contaminants.

According to a further aspect of the invention, a converter for use in decontaminating groundwater containing dissolved volatile organic compounds as described above comprises conduit means for conducting a flow of air carrying the compounds from the air stripper to the converter, a heater means for receiving and preheating the organic compounds-carrying air, a catalytic stage adapted to oxidize organic compounds as the heated air flows therethrough, and an outlet means for delivering gaseous effluent from the catalytic stage into the atmosphere, substantially free of the organic contaminants.

In preferred embodiments of this aspect of the invention, the preheater means comprises a heat exchanger adapted to transfer heat from the gaseous effluent of the catalytic stage into the organic compounds-carrying air.

The invention thus provides a system and method for effective and cost efficient removal of small concentrations of VOCs, e.g., 0.01 to 100 ppm, from water, e.g., groundwater, and returning to the environment both water and gaseous effluent that are substantially free of organic contaminants. There is further provided a retrofit converter for use with an existing air stripper for removing small concentrations of organic compounds from the gaseous effluent of the stripper.

Other features and advantages of the invention will be apparent from the following description of a preferred embodiment and from the claims.

PREFERRED EMBODIMENT

We first briefly describe the drawings:

Drawings

FIG. 3 is a side view of another embodiment of a catalytic stage of the invention.

Figure 1:
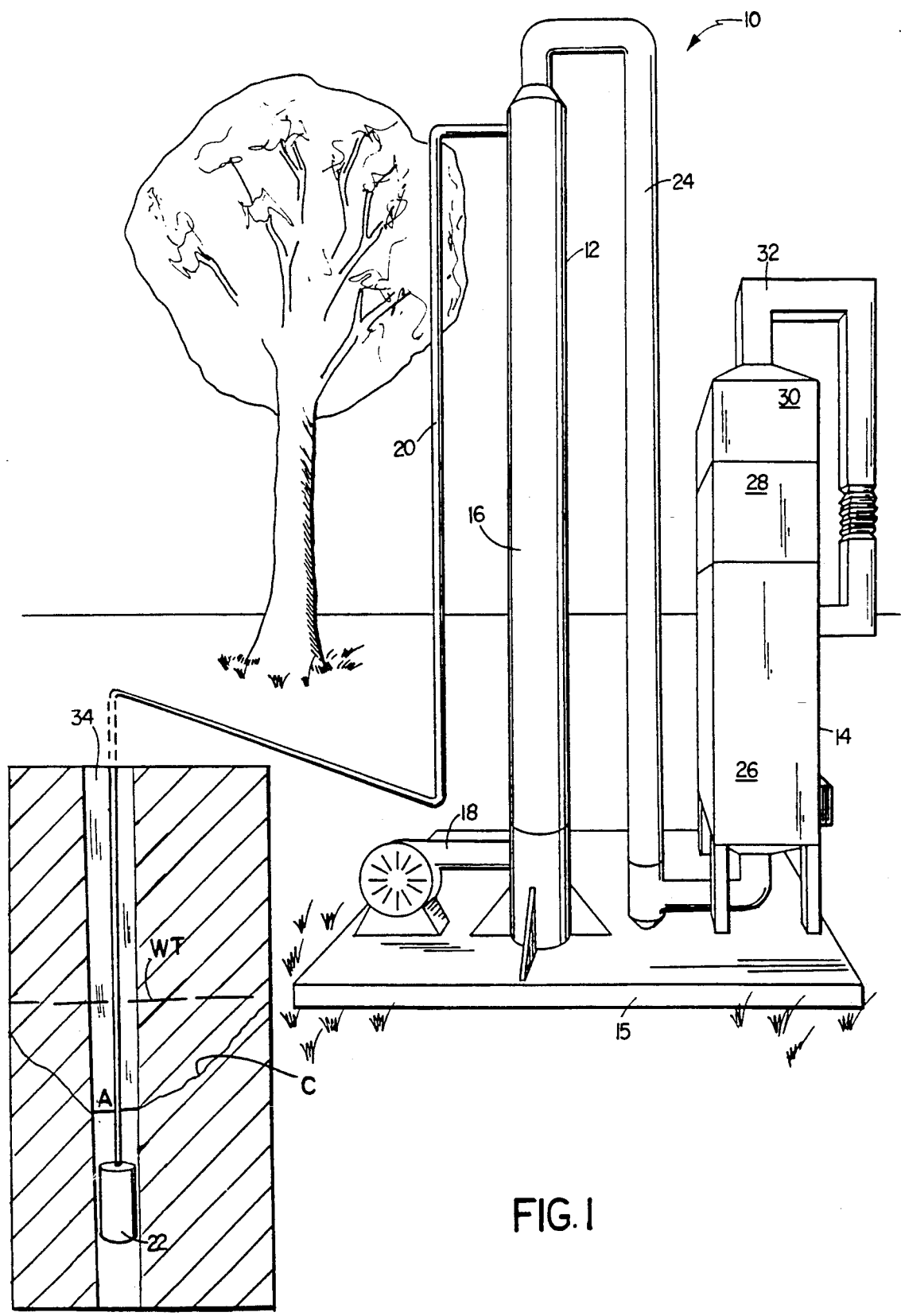
FIG. 1 is a perspective view of a system of the invention in place for removing low concentrations of VOCs from, e.g., contaminated groundwater.

Referring to FIG. 1, a system 10 of the invention is seen in place, e.g., in the vicinity of a fuel or chemical storage facility or filling station, for protection of the environment by removal of small concentrations, e.g., 0.01 to 100 ppm, and typically about 5 ppm, volatile organic compounds (VOCs), e.g., toluene, benzene, xylene, ethyl benzene, halogenated hydrocarbons, etc., from groundwater. The system consists of a stripper stage 12 and a catalytic stage 14 disposed on a concrete pad 15.

Briefly, the stripper stage consists of a packed tower 16, an air blower 18 for delivering a flow of air into the lower portion of the tower, and a conduit 20 connected to a pump 22 for delivery of VOC-contaminated water into the upper portion of the tower. Duct 24 connects the stripper section 12 with the catalytic section 14, extending from the top of tower 16 to the base of heat exchanger 26. The catalytic stage 14 briefly consists of the heat exchanger, preheater 28 disposed atop the exchanger and a catalytic converter 30. Duct 32 connects the outlet of converter 30 to exchanger 26.

For removing small concentrations of VOC contaminants from groundwater in a manner that is effective and also cost efficient, a well 34 is provided to a depth below the level, WT, of the water table. Pump 22, e.g., a ½ horsepower submersible pump, suspended in the well at a depth of 30 feet, below the level of the water table, pumps contaminated groundwater from the well, via conduit 20, into the upper portion 35 of packed tower 16 at a rate in the range of about 3 to 20 gallons per minute (gpm), typically at a rate of about 10 gpm. (As shown, removal of groundwater from the well creates a cone of depression, C, in the water table about the well. VOCs, being lighter than water, float on top of the groundwater, and the cone of depression causes the VOCs to concentrate in the area A of the apex of the cone, at the pump site.)

Figure 2:
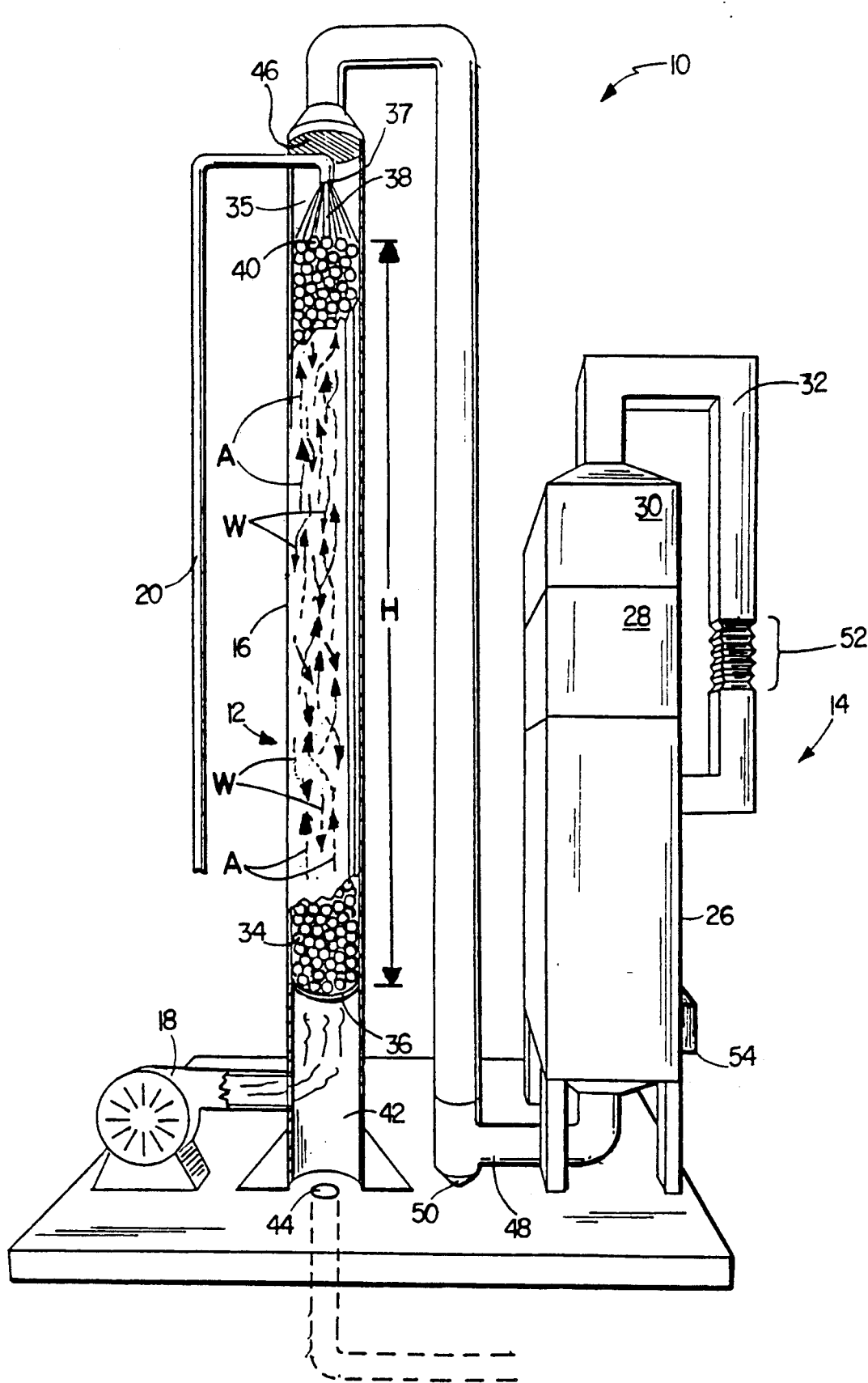
FIG. 2 is a similar view showing the system of FIG. 1, with the packed tower in cross-sectional view.

Referring to FIG. 2, the packed tower 16 is typically of fiberglass-reinforced plastic, containing a column of packing 34, e.g., Jaeger Tripack, polypropylene spheroids 2 inches in diameter, of packed height, H, e.g., about 14 feet, resting on a packing grate 36. The end of conduit 22 carrying VOC-contaminated water terminates within the tower, above the packing, in a spray head 37. The spray head delivers VOC-contaminated water in a 90° cone 38 onto the entire exposed surface 40 of the packing. Blower 18, e.g , a centrifugal fan manufactured by American Fan Co. of Fairfield, Ohio, having a capacity of 1,100 standard cubic feet per minute, delivers a flow of air, e.g., 100 cubic feet per minute is typical, into the lower portion 42 of the packed tower, below grate 36. The air (upwardly-directed arrows, A) flowing upwardly through the packing in countercurrent flow to the water (downwardly-directed arrows, W) flowing downwardly strips the VOCs from the water in a manner known in the art, whereby the water passing through packing grate 36 into the lower portion 42 of the tower is free of contamination, and passes via sump 44 from the tower, usually to be returned to the environment. The VOC-bearing flow of air emerges from the upper surface 40 of the column of packing into tower upper portion 35, and passes through mist eliminator 46, e.g., a plastic mesh, to remove moisture from the flow entering duct 24, e.g., a 6 inch diameter PVC (polyvinyl chloride) pipe. The flow of VOC-bearing air travels vertically downward to a U-bend 48, where there is provided a trap 50 for collection of further condensate from the air flow.

The VOC-bearing, essentially dry air from duct 24 enters the catalytic stage, e.g., in the embodiment of FIGS. 1 and 2, typically about 5 to 7 feet tall and 24 inches square, via the base of heat exchanger 26, a fixed plate, air-to-air heat exchanger, 49 inches high, 15 inches wide and 19 inches deep, having membranes of 18 gauge, 304 stainless steel with welded end and primary seals, as manufactured by Exothermics-Eclipse, Inc., of Toledo, Ohio, to provide side-by-side passages for countercurrent air flow. The relatively cool, VOC-bearing air from the stripper stage flows upwardly through the heat exchanger, and is heated by hot gases flowing countercurrently from duct 32, through the exchanger, as described below. The warmed, VOC-bearing air flowing upwardly from the heat exchanger typically is not at a temperature sufficient for efficient reaction within the catalytic converter, e.g., about 600 to 700° F. is required. The heated VOC-carrying air is passed through preheater 28, containing, e.g., six electric resistive heater elements, e.g., 20 kilowatt, 220 volt, 3 phase, encased in stainless steel U-tubes (not shown), for further heating of the VOC-bearing air. (The heat exchanger membranes and the U-tubes are of stainless steel for extended life and reduced maintenance. It is also important that the air flow be as dry as is practical in order to minimize mineral clogging and scale of the heat exchanger, and to extend the useful life of the catalytic converter section. In instances where the VOCs carried by the air flow produce acid gases upon combustion, e.g., chlorinated hydrocarbons, the surfaces of the ducting and heat exchanger upstream of the catalytic stage may be coated, e.g., with polyvinylidene fluoride (KYNAR®, from Pennwalt Corporation of Philadelphia, Pennsylvania), for additional protection. The U-tubes and the heat exchanger panels are also replaceable in the field for ease of maintenance and reduce downtime.)

The heated, VOC-carrying air flows upwardly from the preheater into the catalytic converter 30, containing the catalyst, e g., a steel screen rolled into a cylinder, coated with platinum, 3.25 inches high and 12 inches in diameter, as manufactured by Johnson-Matthey, through which the VOC-carrying air is caused to flow for conversion of the VOC molecules into carbon dioxide and water. The catalyst is encased in insulation, e.g., Intrim ™ nonasbestos wrapping, manufactured by 3M of Minneapolis, Minnesota, to contain the heat of reaction and to prevent the VOC-carrying air from flowing around the catalyst The hot air, now essentially free of VOCs, flows through duct 32 into heat exchanger 26 for transfer of heat from the hot, now clean air into the contaminated air from the stripper stage. (Bellows section 52 in duct 32 allows the duct to adjust for thermal expansion.) The clean air flows from the heat exchanger 26 via outlet port 54. (Additional ducting may be attached to port 54 to discharge the warm exhaust gases at a position and condition in compliance with local regulations.)

Other embodiments are within the following claims. For example, referring to FIG. 3, other arrangements of catalytic stage components may be employed. In FIG. 3, the heat exchanger 26' of catalytic stage 14' consists of an elongated tank disposed for horizontal cross flow of VOC-carrying air in duct 24' from the stripper stage and hot exhaust gas (in duct 32'. Preheater 28' is mounted above heat exchanger 26'; the arrangement of catalytic converter 30' and duct 32' are as described above, with hot gas from the catalytic converter passed through heat exchanger 26' to be vented to the environment from duct 54'. Other arrangements are also contemplated, e.g., catalytic stage may be mounted on top of stripper stage 12, and the catalytic stage, whether mounted atop or adjacent the stripper stage, may be provided for retrofit to an existing stripper system. All exposed metal surfaces may be wrapped with, e.g., a ceramic fiber insulation to minimize heat losses. The system of the invention may be employed for removing VOCs from an effluent process stream delivered into the packed tower via conduit 20.

The dimension and rates of flow mentioned herein are, of course, provided solely for the purpose of example, and other dimensions and rates may be employed For example, the tower may be 4 feet in diameter, and the packed column may be up to 27 feet high for improved VOC removal efficiency. Water from sump 44 may be recycled to the top of the tower for recirculation, e.g., for further removal of contaminants, or to reduce the concentration of VOCs in the water to be treated.

What is claimed is:

1. A decontamination converter apparatus installed at an outdoor site where volatile organic compounds have been stored, and where such compounds have entered the ground as contaminants and endanger the roundwater, the apparatus comprising an inlet conduit constructed to receive an air stream, produced at the site, that carries said organic contaminants; preheating means comprising (a) a heat exchanger and (b) an externally powered heater, said preheating means arranged to preheat said site-produced air stream carrying said contaminants; an oxidizing catalytic converter having a predetermined minimum operating temperature for efficient operation and arranged to receive the said air stream from said preheater means and constructed to oxidize said organic contaminants to produce a decontaminated effluent air stream substantially free of said organic contaminants; and ducting directing the thus decontaminated, hot effluent air stream from said catalytic converter through said heat exchanger and thence to the atmosphere; said heat exchanger being effective to cause the decontaminated air stream to transfer heat to the incoming site-produced air stream that carries said contaminants and said heater of said preheating means constructed and arranged to cooperate with said heat exchanger to elevate the temperature of said preheated air stream reaching said catalytic converter to at least said minimum operating temperature, to ensure catalytic conversion of said organic contaminants to decontaminated form before release to the atmosphere.

2. A decontamination converter apparatus installed at an outdoor site where volatile organic compounds have been stored, and where such compounds have entered the ground as contaminants and endanger the groundwater, the apparatus comprising an inlet conduit constructed to receive an air stream, produced at the site that carries said organic contaminants; preheating means comprising (a) a heat exchanger and (b) an electrically powered heater containing electric resistance heater elements, said preheating means arranged to preheat said site-produced air stream carrying said contaminants; an oxidizing catalytic converter having precious metal as its active material, said converter having a predetermined minimum operating temperature of between about 600 degrees and 700 degrees Fahrenheit for efficient operation, and arranged to receive the said air stream from said preheater means and constructed to oxidize said organic contaminants to produce a decontaminated effluent air stream substantially free of said organic contaminants; and ducting directing the thus decontaminated, hot effluent air stream from said catalytic converter through said heat exchanger and thence to the atmosphere; said heat exchanger being effective to cause the decontaminated air stream to transfer heat to the incoming site-produced air stream that carries said contaminants and said heater of said preheating means constructed and arranged to cooperate with said heat exchanger to elevate the temperature of said preheated air stream reaching said catalytic converter to at least said minimum operating temperature, to ensure catalytic conversion of said organic contaminants to decontaminated form before release to the atmosphere.

3. The decontamination apparatus of claim 1 or 2 wherein said heater is disposed to receive said contaminated air stream in series with and downstream of said heat exchanger.

4. The decontamination apparatus of claim 3 wherein said heat exchanger is constructed and arranged to define substantially horizontal counterflow paths for the hot effluent air stream from said catalytic converter and the incoming site-produced air stream carrying said contaminants.

5. The decontamination apparatus of claim 4 wherein said heat exchanger is elongated and has at a first end a connection to receive the hot effluent air stream from said catalytic converter and at the opposite end an outlet for said gases cooled as a result of passing through said heat exchanger, for release to the atmosphere, and connections in the vicinity of the top of the heat exchanger at one end for receiving the inlet flow of site-produced air carrying organic contaminants and at the other end an outlet for said air stream partially preheated as a result of passing through said heat exchanger, for flow to said heater and thence to said catalytic converter.

6. The decontamination apparatus of claim 5 wherein said heater and catalytic converter are arranged in series in a vertically arranged loop of duct extending from the top of the heat exchanger to said first end of said heat exchanger.

* * * * *